United States Patent [19]
Turos

[11] 3,969,876
[45] July 20, 1976

[54] COMBINATION MOWER AND CATCHER

[75] Inventor: William E. Turos, Parma, Ohio

[73] Assignee: MTD Products Inc., Cleveland, Ohio

[22] Filed: Apr. 18, 1975

[21] Appl. No.: 569,465

[52] U.S. Cl. .............................................. 56/202
[51] Int. Cl.² ....................................... A01D 35/22
[58] Field of Search ................... 56/202, 12.8–13.4, 56/15.8, 320.2

[56] References Cited
UNITED STATES PATENTS

| | | | |
|---|---|---|---|
| 3,134,214 | 5/1964 | Shaw | 56/202 |
| 3,624,989 | 12/1971 | Gotheridge | 56/202 |
| 3,657,865 | 4/1972 | Ober | 56/13.3 |
| 3,686,840 | 8/1972 | Root | 56/15.8 |
| 3,716,977 | 2/1973 | Jackson | 56/202 |
| 3,820,313 | 6/1974 | Hoffmann | 56/202 |
| 3,893,284 | 7/1975 | Thon et al. | 56/202 |

Primary Examiner—Russell R. Kinsey
Attorney, Agent, or Firm—Woodling, Krost, Granger & Rust

[57] ABSTRACT

The invention is directed to the combination of a mower having a rear discharge opening and a catcher for receiving cut grass and air mixed with the cut grass blown rearwardly through the discharge opening of the mower. There are means provided for affecting the deposit of cut grass in the catcher and for permitting the egress of air therefrom. Unique means are provided for delivering cut grass and air blown by the rotating cutting blade of the mower back through the mower and into a catcher carried at the rear of the mower. Baffle and deflecting means are provided for aiding in separating of the cut grass in the catcher to be deposited therein and the escape of air therefrom. This is an abstract only of the specific illustration of the invention given by way of example, and is not to be used in the interpretation of the claims nor as a limitation on the scope of the invention.

20 Claims, 5 Drawing Figures

COMBINATION MOWER AND CATCHER

An object of my invention is to provide a unique mower and grass catcher arrangement wherein the cut grass is discharged rearwardly of the mower thereby permitting a minimization of the width of the mower and its cutting unit so as to be able to get close to trees, bushes and the like when mowing a lawn.

Another object is the provision of providing for the rear discharge of cut grass of the like from the rear end of a mower and into a catcher carried by the rear end of the mower.

Another object is the provision for directng air escaping from the catcher on a rear end of a mower so as to minimize the blowing of dust and fine particles of cut grass upwardly along the sides of the mower.

Another object is to provide for assuring that the catcher is always in proper carrying position for receiving cut grass when the cutting unit of the mower is being operated.

Other objects and a fuller understanding of this invention may be had by referring to the following description and claims, taken in conjunction with the accompanying drawings, in which:

Figure 1:
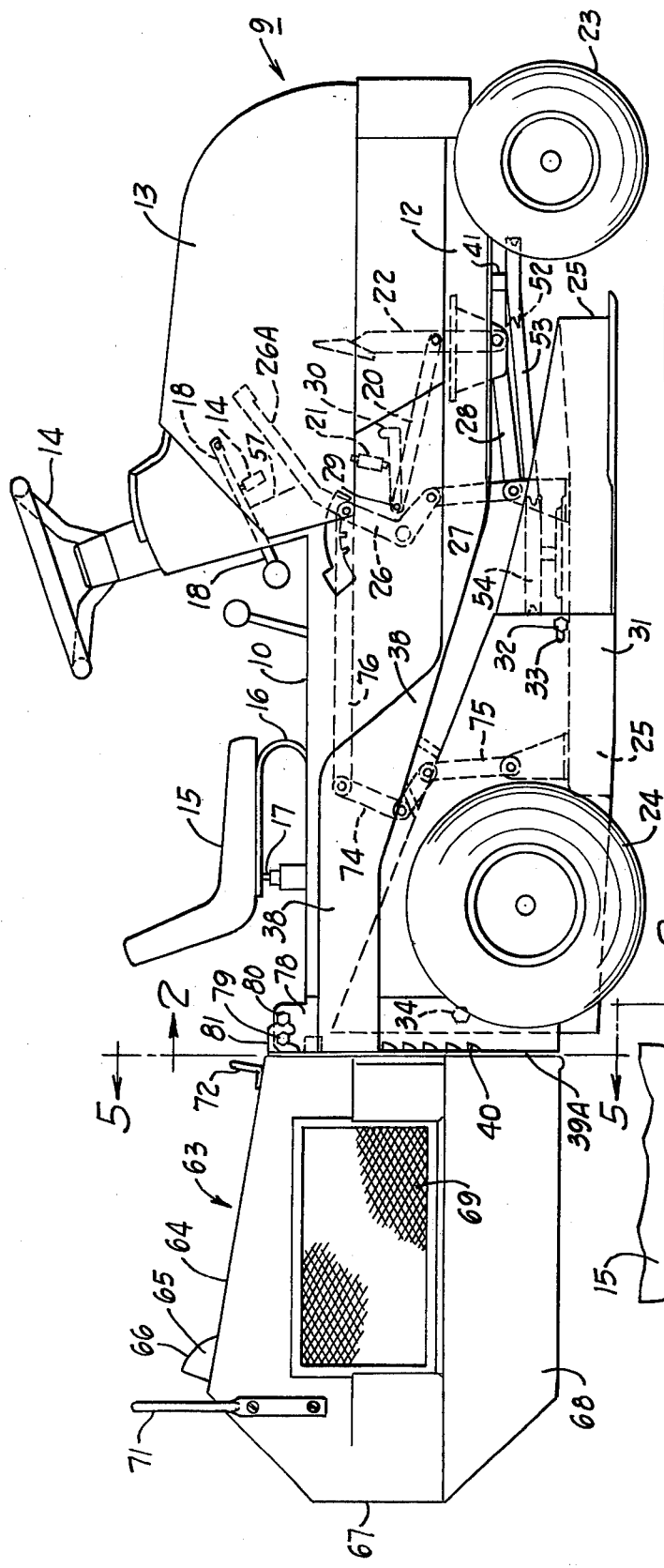
FIG. 1 is a longitudinal view, partially in section, of a mower and catcher embodied in my invention.
Figure 5:
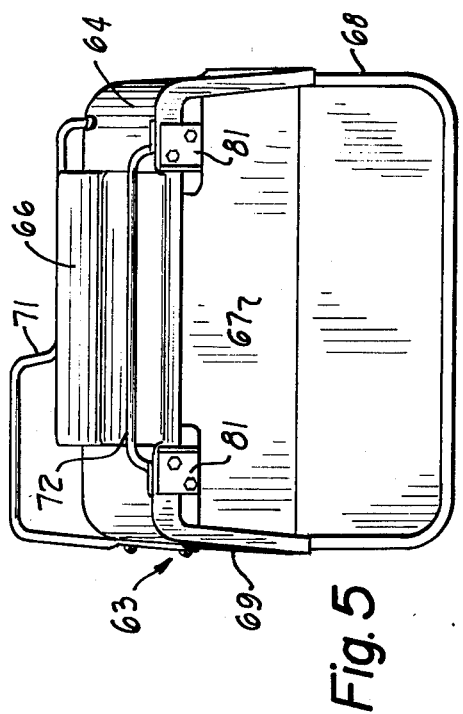
FIG. 5 is a view looking into the forwardly directed open end of my catcher when removed from the mower.

My improved mower tractor unit is denoted generally by the reference character 9. There is an upper part of the mower tractor body 10 of general U-shape in cross-section, the sidewalls thereof being denoted by the reference character 10A. A lower portion of the mower tractor in a general horizontal position is denoted by the reference character 11. The chassis of the mower tractor, of a pressed metal stamping form, is denoted by the reference character 12.

An internal combustion engine 13 is mounted forwardly on the mower tractor, this engine having the usual electrical ignition system. A steering wheel 14 extends upwardly for providing the steering of the mower tractor by the operator. A seat 15 is occupied by the operator who straddles the U-shaped upper part 10 and places his feet on the clutch pedal 22 on the left side of the mower and corresponding brake pedal 60 on the right side of the mower. A through shaft 59 extends transversely of the mower tractor and a rod between the shaft 59 and the brake of the tractor is provided for actuating the brake upon pressing the brake pedal 60 downwardly. There is provided such a play in the movement of the clutch pedal 22 and the brake pedal 60 that the clutch pedal 22 on the left side may be depressed while the brake pedal 60 on the right side is not depressed. For purposes of simplicity of illustration, only the left side clutch pedal 22 is shown in FIGS. 1 and 4, whereas both pedals are shown in FIG. 3.

When right and left hand sides are being referred to, it is to be understood that this is to be taken in conjunction with the operator sitting in the seat 15 and looking forwardly over the engine 13 at the forward end of the mower tractor.

Supporting the seat 15 is a U-shaped spring 16 which deflects upon the seat 15 being occupied by the operator. Below the spring 16 is a switch 17 which is open when the seat is occupied, but closed when the seat is not occupied. In other words, deflection of the spring 16 downwardly opens the switch 17.

Figure 3:
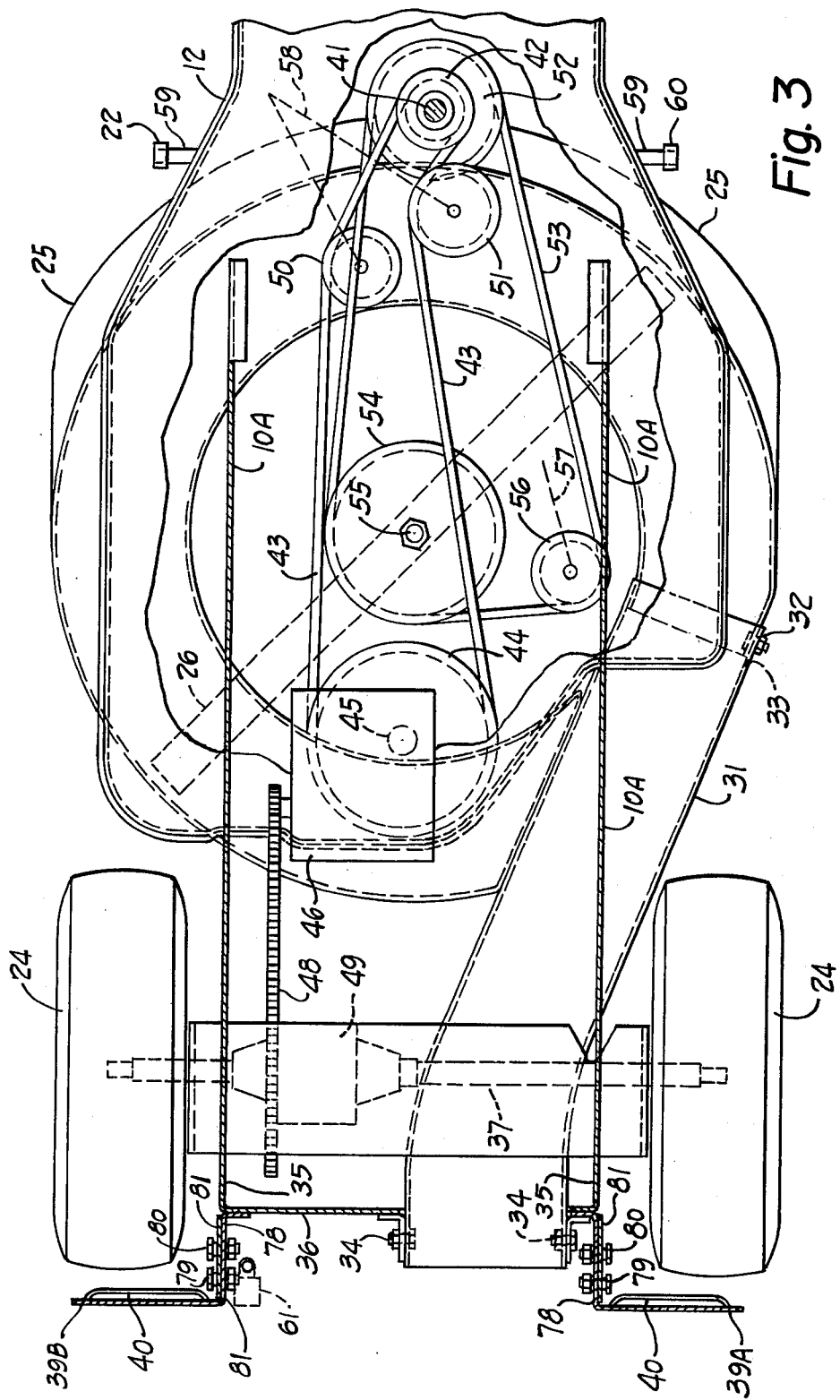
FIG. 3 is a plan view, partialy in section, of my improved mower with the catcher removed and the forward end of the mower not being shown.
Figure 4:
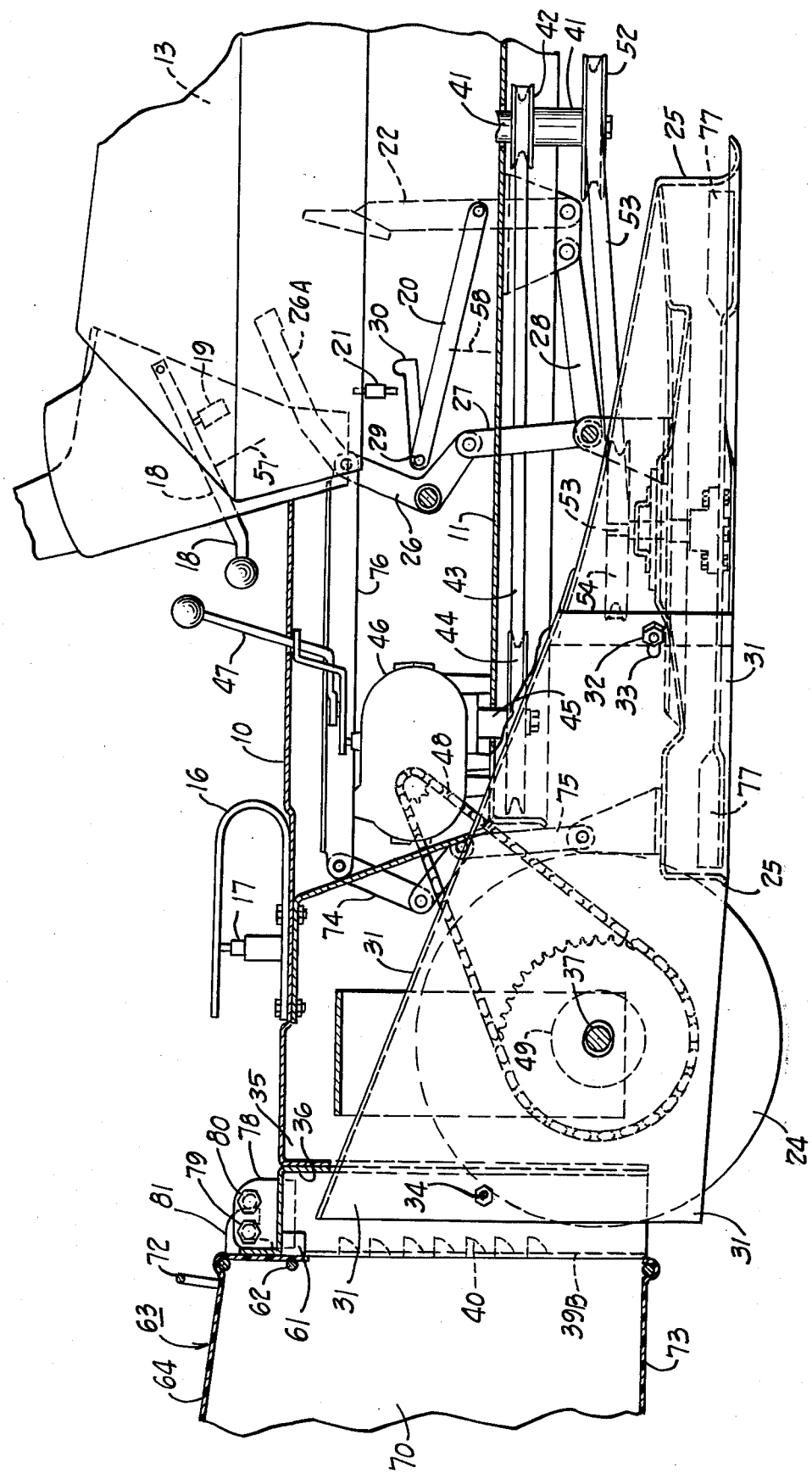
FIG. 4 is a longitudinal view, partially in section, of my mower with the catcher mounted thereto at the rear end and showing other details of the structure, the rearward end of the catcher and the forward end of the mower not being shown.

There is provided a lever 18 in position to be swung upwardly and downwardly by the operator, which lever 18 actuates through a mechanical linkage 57 shown diagrammatically in broken lines in FIGS. 1, 3 and 4, a swinging bracket which moves an idler pulley 56 which in turn loosens and tightens belt 53 that drives the cutting unit of the mower. Downward movement of the handle or lever 18 causes the cutting unit 25 to be in a clutched condition and movement upwardly of the handle of lever 18 causes the cutting unit 25 to be in an unclutched condition. In line with the swinging movement of the lever 18 is a switch 19 so positioned that the switch 19 is actuated upon downward movement of the lever 18. This switch 19 is normally closed and is open when the blade or cutter clutch is disengaged.

The mower tractor has the usual front steerable wheels 23 and the usual drivable rear wheels 24 as shown.

For raising and lowering the cutting unit 25 relative to the mower, and hence relative to the ground upon which the mower tractor traverses, there is provided a linkage comprising a crank arm 26, link 27, link 28, link 74, link 75, and link 76 so arranged that upon moving of a lever 26A attached to the crank arm 26, the cutting unit 25 may be raised and lowered. A suitable detent and pawl arrangement is provided for securing the lever 26A in desired position and hence for fixing the elevation of the cutting unit 25 at the height desired.

Attached to the clutch pedal 22 is a lever 20 which has a pin 29 at its rearward end, pin 29 rides in and slides along a slot 30 in the sidewall of the mower tractor. The slot 30 has an upward dwell portion at its forwardmost end in which the pin 29 may move as desired, the lever 20 being biased upwardly (by means not shown) to engage in the dwell of the slot 30. When it is desired to disengage the pin 29 from the dwell in slot 30, the operator pushes the pin 29 downwardly to permit the pin 29 to move rearwardly and hence the clutch pedal 22 to move rearwardly. A suitable button on the outside of the mower tractor carried on the end of the pin 29 is provided for the operator to manually seize and move the pin 29 so as to unlock it from the dwell of slot 30.

Carried by the mower tractor is another switch 21 disposed to be engaged by a side edge of the lever 20 so as to actuate this switch 21 upon the lever 20 moving forwardly along with the pedal 22. This switch 21 is normally closed when the clutch pedal 22 and lever 20 are in position such that the clutch of the drive mechanism is engaged. However, when the clutch of the drive mechanism of the mower tractor is disengaged, then the switch 21 is in an open position.

Actuated by clutch pedal 22 there is a mechanical linkage 58 (comprised of a Bowden cable indicated diagrammatically by broken lines in FIGS. 1, 3 and 4) between the clutch pedal 22 and bracket carrying idler pulleys 50 and 51, which idler pulleys 50 and 51 are positioned to tighten or loosen the belt 43 which rotates the pulley 44 on shaft 45, which in turn drives the transmission unit 46. Thus, operation of the clutch pedal 22 puts the drive transmission 46 in a clutched or unclutched position. When in a clutched position the mower tractor is driven through the power transmitted through belt 43, pulley 44, shaft 45 and transmission 46. The transmission 46 in turn through a chain drive 48 drives the rear axle through a suitable differential unit 49 in the usual manner of such mower tractors. An axle housing 37 surrounds the rear axle, which rear axle carries the rear driving wheels 24.

Extending downwardly from the engine 13 carried at the forward end of the mower tractor, is a shaft 41 which rotates upon operation of the engine. There is an upper pulley 42 splined or non-rotatably secured to shaft 41 so as to rotate therewith. There is also a lower pulley 52 splined or otherwise non-rotatably secured to shaft 41 so as to rotate therewith. The belt 53 reeved around the pulley 52 is also reeved around a pulley 54 which drives or rotates the blade 77 within the housing of the cutting unit 25. The pulley 54 is splined or otherwise non-rotatably secured to a shaft 55 to which the blade 77 is non-rotatably secured. Rotation of pulley 52 rotates the pulley 54 by means of the belt 53. The pulley 54 in turn rotates the shaft 55 which causes rotation of the blade 77 within the housing of the cutting unit 25. As usual for such cutters, the blade 77 has lower edges which cut upstanding grass below the cutting unit and also carries flanges or wing portions which move the air within the cutting unit and blows the cut grass outwardly of the cutting unit 25.

The cutting unit 25 has on a sidewall thereof a discharge opening through which cut grass and air blown by the blade 77 may be discharged out from the cutting unit. To direct the cut grass and blown air rearwardly of the mower, I provide a chute 31 of a generally inverted U-shape. A forward end of this chute 31 is secured to the housing of the cutting unit 25 by a pivot pin 32 extending through an elongated slot 33. The rearward end of the chute 31 is enlarged in that it extends in a gradual incline upwardly as it extends rearwardly in the mower tractor. The rearward end of the chute 31 is pivotally secured by means of two pivot pins 34 which pivotally connect the chute 31 to end wall member 36 at the rear opening of the mower.

The mounting of the chute 31 by means of the rearward pivot connections 34 and the forward pivot connections 32 is such that as the cutting unit is raised up and down to different desired cutting heights, the chute may accommodate itself to this movement. The slot 33 permits the pin 32 to move lengthwise in the slot 33 as the cutting unit 25 is raised and lowered and hence as the chute 31 pivots on the pins 34.

Figure 2:
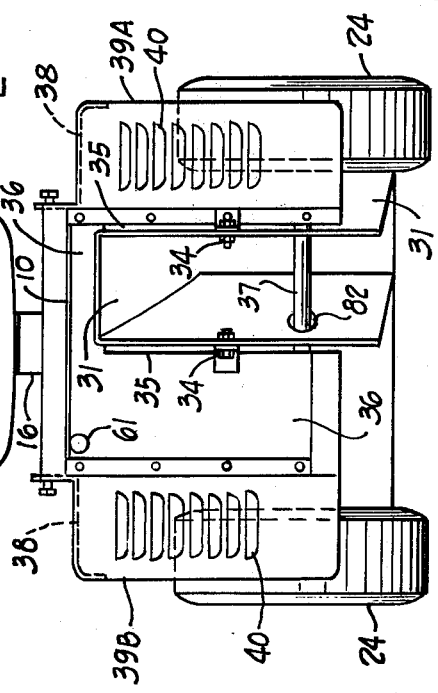
FIG. 2 is a view looking in the direction of arrows 2—2 of FIG. 1 which is looking at the rear end of the mower with the catcher removed.

Outwardly of the chute 31 and carried by the mower tractor are rear sidewalls 35 and closing off the rear end of the mower tractor, in the area bounded by the rear sidewalls 35 of the mower tractor, is the end wall member 36. Thus as seen in FIG. 2, the rear end of the mower is closed except for the opening through which the rear end of the chute 31 protrudes. Cut grass and blown air discharged by the cutting unit 25 are passed through the chute 31 and discharged out through the rearward end of the chute 31. There are suitably enlarged holes 82 in the opposite sidewalls of the chute 31 to accommodate the axle housing 37 extending therethrough. The holes 82 are sufficiently large relative to the outer diameter of the housing 37 to permit the chute 31 to pivot about the pivot pins 34 without hindrance from the axle housing 37.

Carried by the mower tractor are two fenders or guards 38 disposed over the rear wheels 24 so as to first extend generally horizontally and then extend downwardly and forwardly. These fenders 38 are of a width to extend over most of the rear wheels 24 as illustrated. Extending laterally outward on the opposite sides of the mower tractor at the rear end thereof are a pair of wing or baffle walls 39. The right hand wing or baffle wall 39 being denoted by the reference character 39A and the left hand wing or baffle wall being denoted by the reference character 39B. These wings or baffle walls 39A and 39B extend downwardly from the fenders 38 toward the ground for a substantial distance as illustrated in the drawings. Each wing or baffle wall 39A and 39B has a plurality of louvers 40 cut therein in a manner that the displaced metal extends forwardly and upwardly whereby the louvers 40 provide deflectors which deflect blown air, and any cut grass not deposited in the catcher at the rear of the mower, in a direction upwardly and forwardly under the bottom surface of the fenders 38. Thus any particles of cut grass, dust and air leaving the catcher and moving forwardly is vented through the louvers 40 and deflected forwardly and upwardly so as to be encountered by the underside of the fenders 38. Carried on the rear end of the mower tractor is a grass catcher denoted generally by the reference character 63. The grass catcher 63 is preferably made of suitable plastic reinforced with glass fibers or other suitable reinforcing means. It is rigid in nature and sustains its own shape without suspension from a support and without being blown into shape by air blown into the same. In short, the catcher has the relatively rigid and fixed shape shown in the drawing.

The catcher 63 has a top wall 64, bottom wall 73, a rear wall 67, a left hand side wall 70 and a right hand side wall 68. These several walls form the catcher 63. It has a forwardly directed opening which is directed toward the rear end of the mower tractor. The forwardly directed opening of the catcher 63 has such a width as to extend across the rear end of the mower and to include most of the wings or baffle walls 39A and 39B. The sidewalls of the catcher generally coincide with the outer edges of the wings or baffle walls 39A and 39B. The chute 31 is directed to discharge cut grass, dust and blown air derived from the cutting unit 25 into the catcher 63.

The catcher 63 has a screened opening 65 in the upper wall 64 for the egress of air therefrom while retaining cut grass within the catcher by means of the screening on the opening 65. A deflecting shield 66 is provided to deflect air, dust and any particles leaving the screened opening 65 toward the rear of the catcher and away from the operator sitting in the seat 15 of the tractor. On the right hand side of the catcher there is provided a screened opening 69 in the right hand sidewall 68. This screened opening also permits air, dust and other small particles to be blown out of the catcher while retaining cut grass within the catcher. The shape and contour of the catcher is such that some of the air blown into the catcher from the chute 31, along with any cut grass carried thereby, circulates within the catcher and thence flows forwardly seeking egress from the catcher at the location of the wings or baffle walls 39A and 39B. The cut grass in general is retained within the catcher but air not being blown out through the screened openings 65 and 69 will tend to circulate and move forwardly and hence through the openings provided by the louvers 40. These louvers 40 deflect the air upwardly along with any grass that might escape through the louvers 40. There may be dust, particles and possibly small bits of cut grass not deposited in the catcher which escape through the louvers. Such dust, small particles and residual cut grass is thus directed upwardly and forwardly by the louvers 40 in the wings 39A and 39B.

The arrangement of the openings and the shape and contour of the catcher is such that most of the cut grass is deposited within the catcher 63. A maximum amount of cut grass is retained in the catcher by means of the novel venting provisions that are made in the catcher, these venting means including the screened opening 65, the screened opening 69, and the louvers 40 in the two wing and baffle walls 39A and 39B. It is found that very little cut grass escapes from the catcher by reason of the improved path of the air in the catcher and the catcher 63 will be almost filled with cut grass before it needs to be emptied. A great improvement in efficiency of catching grass is thus provided by my novel catcher in combination with the louvered wings here described.

For convenient handling of the catcher, there is provided a forward handle 72 and a rearward handle 71 secured to the catcher and extending therefrom as illustrated.

The mower tractor at its rearward end thereof is provided with a pair of spaced brackets 78 extending upwardly therefrom. These two brackets 78 provide ears for the support of the catcher. Each bracket 78 has pins 79 and 80 protruding laterally outward therefrom, these two pins 79 and 80 being somewhat spaced apart longitudinally of the tractor. As there are two brackets 78, each bracket has a pin 79 and a pin 80 extending laterally outwardly therefrom.

Firmly secured to the catcher 63 adjacent its upper wall 64 and to its two sidewalls 68 and 70 are two hook members 81. These hook members 81 are disposed to hook over and to engage the supporting pins 79 laterally outward of the two brackets 78, whereby the weight of the catcher and its contents is carried by the two pins 79 over which the hook members 81 engage. The catcher 63 may pivotally swing upwardly about the pivot support provided by pins 79 whereby the normally forwardly directed open end of the catcher 63 is directed downwardly to permit the contents, such as the collection of cut grass therein, to fall downwardly upon the ground when it is desired to empty the catcher. For this purpose, to limit forward swinging of the catcher 63, the pins 80 provide stop means so that the catcher 63 may not swing upwardly and forwardly too far toward the seat 15 on the tractor. Also the pins 80 tend to hold the hook members 81 from moving too far forwardly away from the pins 79 and thus to limit movement of the catcher relative to the tractor while in travel.

Also, the catcher 63 may be bodily removed from the mower tractor by one seizing the handles 71 and 72 and lifting the catcher 63 directly upwardly to remove the hook members 81 from the pins 79. The catcher 63 may then be manually moved away from the mower tractor to a position where the contents of the catcher may be dumped out through its open end. Thereafter the catcher is replaced on the mower tractor to its original position which is the position shown in the drawings.

When it is desired to merely tip the catcher 63 while it is still engaged on the two pins 79, the operator may reach back and take hold of the handle 71 and by pulling on the handle 71, tip the catcher upwardly and forwardly so as to dump out the contents of the catcher on to the ground.

There is mounted on the mower tractor at the rear end thereof on one side of the mower tractor a reed type electric switch 61. For actuating the reed switch 61 a permanent magnet 62 is mounted on the catcher 63 with non-magnetic mounting means in such a position that the magnet 62 engages where it is sufficiently close to the reed switch 61 as to be able to influence the actuation of the reed switch 61. The switch 61 on one of its poles is grounded and the reed switch 61 is normally open when the catcher is mounted in grass catching position on the tractor, such as shown in FIGS. 1 and 4. However, when the catcher is either tilted upwardly from the tractor on the pins 79 or is removed from the tractor, then the magnet 62 is so moved away from the switch 61 that the switch 61 is closed whereby both poles of the switch 61 are grounded. It is thus seen that the reed switch 61 and the magnet 62 provide sensing means for sensing when the catcher 63 is down in its proper grass catching position and also for sensing when it is out of that grass catching position, such as when it is tilted upwardly for dumping the contents therefrom and such as when it is bodily lifted up and off of the mower tractor. The function of the reed switch 61 is described in the hereinafter identified patent application of Thomas J. Nofel.

The operation, function, electrical connections between, and the purposes of the several switches 17, 19, 21 and 61 are described more fully in concurrently filed U.S. Pat. application by Thomas J. Nofel, Ser. No. 569,561 filed Apr. 18, 1975 and assigned to the assignee of this application. As indicated in said Thomas J. Nofel patent application, the switches are provided for grounding the ignition system of the mower tractor at certain times in accordance with certain operating functions of the mower tractor.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The combination of an engine driven rotary mower having a pair of laterally spaced rear wheels and having a cutting unit including a rotary blade and housing for the blade, said cutting unit being movable to different elevations relative to said mower, the housing having a discharge opening through which cut grass and a current of air blown by the blade is discharged, a grass catcher having a forwardly directed opening and carried by the mower at the rear thereof for receiving cut grass blown with air into said forwardly directed opening thereof, said catcher having screened egress means for the escape of the current of blown air therefrom while retaining cut grass in the catcher, chute means carried by the mower extended between said rear wheels and providing communication between said discharge opening of the said blade housing and to said catcher for directing cut grass and blown air from said discharge opening between said rear wheels and through said forwardly directed opening of the catcher into said catcher, said chute means being movable with the cutting unit to accommodate different elevations of the said cutting unit.

2. The combination claimed in claim 1 and including safety electric switch means carried by the mower and catcher automatically operable upon movement of the catcher away from the mower for use in affecting operation of the mower engine in accordance with the position of the catcher moved to and away from the mower.

3. The combination claimed in claim 1 and including deflecting means carried by the mower inclined to direct air blown through the catcher by said blade, not escaping from the catcher through said screened egress means, forwardly and upwardly near the rear of the mower.

4. The combination claimed in claim 1 and including mounting means for said catcher, said mounting means having cooperable parts carried by the mower and catcher arranged to permit the catcher to be bodily removed from the mower and alternately to be swung upwardly relative to the mower for tipping the catcher and permitting the contents to fall downwardly therefrom.

5. The combination of a rotary engine-driven mower, said mower having a cutting unit carried thereby to be driven by the said engine, said cutting unit having rotating blade means for cutting grass and blowing air upon rotation, said cutting unit being movable to different elevations relative to the mower, said cutting unit having a discharge opening from which cut grass and blown air is directed by the said rotating blade means, a grass catcher disposed at the rear end of the mower for receiving cut grass and blown air directed thereto, said catcher having a forwardly directed opening through which cut grass and blown air may pass into the catcher, chute means for conducting cut grass and blown air from said discharge opening of the cutting unit to the rear end of the mower and through said forwardly directed opening of the catcher into said catcher, said chute means maintaining communication with said discharge opening of the cutting unit at its different elevations relative to the mower, and venting means carried by the mower at the rear end thereof, said venting means being disposed adjacent, and registering with a portion of, said forwardly directed opening of the catcher to permit blown air in the catcher, and cut grass not deposited in the catcher, to be discharged from the catcher through said venting means.

6. The combination claimed in claim 5 and in which said venting means includes deflecting means to deflect said blown air and cut grass discharged through the venting means forwardly and upwardly.

7. The combination claimed in claim 5 and in which said venting means include wing baffles carried by, and extending laterally outward of, the mower adjacent the rear end thereof and on opposite sides of the mower, said wing baffles being aligned with said catcher on said opposite sides to register with a portion of said opening, said wing baffles each having deflecting portions for deflecting blown air and cut grass not deposited in the catcher and moving forwardly through said forwardly directed opening of the catcher.

8. The combination claimed in claim 5 and in which said catcher has screened opening means in the wall thereof to permit escape of blown air in the catcher through said screened opening means, and said venting means including baffles extending laterally outwardly from the mower adjacent the rear end thereof in alignment with the catcher at opposite sides of the mower to register with a portion of said opening, said baffles having openings therein and deflecting louvers carried thereby for discharging through the openings, and for deflecting, blown air and cut grass as may not have been deposited in the catcher and which passes forwardly from said forwardly directed opening of the catcher to be deflected upwardly, and guard means carried by the mower on opposite sides thereof and positioned so as to encounter the blown air and said cut grass not deposited in the catcher directed upwardly by said louvers.

9. The combination of a mower for cutting grass and blowing the cut grass rearwardly through the rear end of the mower, a catcher carried by the mower at said rear end thereof for catching grass blown rearwardly of the mower, said catcher extending laterally outward from opposite sides of the mower to permit air blown into the catcher by the mower to pass forwardly from the catcher on said opposite sides of the mower, mounting means carried by the mower and catcher for supporting the catcher on the mower, said mounting being arranged for permitting the catcher to be tipped while carried on the mower and for permitting the catcher to be removed from the mower, and wing baffles carried by the mower adjacent the rear end of, and on opposite sides of, the mower, and in advance of the catcher extending laterally outwardly from the opposite sides of the mower to encounter blown air passing forwardly out of the catcher at said opposite sides, and wing baffles including venting means to permit said air to pass therethrough and deflecting means to deflect said air passing therethrough upwardly and forwardly.

10. The combination claimed in claim 9 and in which there are guards carried by the mower in a position over rearwardly disposed wheels of the tractor, said guards extending forwardly of said wing baffles and thence downwardly, said guards intercepting said air passing through, and deflected upwardly by, the wing baffles to limit upward and forward movement along the mower of any cut grass not deposited in the catcher and blown forwardly with said air passing through the said wing baffles.

11. The combination claimed in claim 9 and including means for intercepting any cut grass not deposited in the catcher and passing through the venting means of the wing baffles and being deflected by the deflecting means to limit upward and forward movement of such cut grass along the sides of the mower.

12. The combination claimed in claim 9 and including means carried by the mower and catcher for sensing whether or not the catcher is fully in position at the rear end of the mower for receiving cut grass blown rearwardly through the rear end of the mower.

13. Grass catching apparatus for a rotary grass mower having a discharge duct at its rear end through which cut grass and air blown by the mower is discharged, comprising the combination of a catcher of self-sustaining noncollapsible structure carried by the mower at the rear end of the mower, said catcher having a forwardly directed open space wider than the lateral extent of the rear end of the mower, said forwardly directed open space, upon positioning of the grass catcher in grass catching position, being adapted to permit cut grass and air blown through said discharge duct of the mower to enter said catcher and also being adapted to permit blown air and cut grass not deposited in the catcher to leave said catcher forwardly along the outer lateral sides of the mower, said baffle means positioned to extend laterally outward from the outer lateral sides of the mower and in advance of the forwardly directed open space of the catcher along the outer lateral sides of the mower for limiting forward movement of cut grass with said blown air from said catcher through said forwardly directed open space of the catcher, said baffle means extending substantially the heighth of said open space of the catcher to substantially block the opening laterally outward of said mower, said baffle means including a plurality of openings therethrough at a plurality of spaced intervals therealong for venting therethrough blown air and cut grass not deposited in the catcher, and including deflecting means for directing such blown air and cut grass vented through said openings.

14. Grass catching apparatus as claimed in claim 13 and in which said deflecting means are oriented for deflecting blown air and cut grass not deposited in the catcher upwardly and forwardly, and in which said mower includes guard means carried by the mower for restricting upward and forward movement of said blown air and cut grass deflected upwardly and forwardly by said deflecting means along the outer lateral sides of the mower.

15. Grass catching means as claimed in claim 13 and including sensing means cooperably carried by the mower and catcher to sense when the catcher is carried in grass-catching position on said mower, said sensing means being adapted to provide an electrical signal in accordance with the presence and lack of presence of the catcher in grass-catching position at the rear end of the mower.

16. The combination of a rotary mower having two spaced rear wheels and having a cutting unit carried thereby for cutting the grass and blowing the cut grass rearwardly through the rear end of the mower, said cutting unit having a housing in which the cut grass is circulated and an opening in a peripheral wall thereof through which the cut grass is blown from the housing, a grass catcher carried by the rear end of the mower, said catcher having a forwardly directed open end through which blown cut grass enters into the catcher, and a chute carried by the mower and extending from said housing at the said opening in the peripheral wall thereof and below the mower between the rear wheels of the mower to the rear end of the mower to provide communication from said housing to said catcher for the blowing of cut grass from the housing through the chute to the catcher.

17. The combination claimed in claim 16 and in which said chute is so connected to the said housing as to maintain said communication between the housing and catcher at varying elevations of the cutting unit relative to the mower.

18. The combination claimed in claim 16 and in which said chute has a bottom opening facing downwardly toward the ground for the major portion of its length extending from the said cutting unit.

19. The combination claimed in claim 16 and in which the said chute extending between said two rear wheels of the mower is disposed closer to one of said rear wheels than the other wheel and the rearward open end of the chute is disposed to discharge blown cut grass into the forwardly directed open end of the catcher more on one side of the catcher than the other side of the catcher, said one side of the catcher being on the side adjacent said one of the rear wheels.

20. The combination claimed in claim 16 and in which said chute in cross section is an inverted U through a major portion of its length, in which the chute adjacent its rearward end is pivotally connected to the mower to permit raising and lowering of the forward end of the chute, and in which the chute adjacent its forward end is both pivotally and slidably connected to the housing of the cutting unit to accommodate movement of the cutting unit to different elevations relative to the mower.

* * * * *